United States Patent [19]

Gollinger et al.

[11] Patent Number: 4,798,228

[45] Date of Patent: Jan. 17, 1989

[54] MULTI-LIQUID CONTROL VALVE SYSTEM, PARTICULARLY FOR FLEXOGRAPHIC INK OF DIFFERENT COLORS

[75] Inventors: Franz X. Gollinger, St. Petersto; Georg Bock, Augsburg, both of Fed. Rep. of Germany

[73] Assignee: M.A.N.-Roland Druckmaschinen AG, Offenbach am Main, Fed. Rep. of Germany

[21] Appl. No.: 114,212

[22] Filed: Oct. 28, 1987

[30] Foreign Application Priority Data

Nov. 12, 1986 [DE] Fed. Rep. of Germany ....... 3638607

[51] Int. Cl.[4] ............................................. F16K 11/08

[52] U.S. Cl. ............................... 137/625.47; 137/887; 101/425

[58] Field of Search ................... 137/887, 884, 625.47, 137/625.41, 597; 101/336, 425

[56] References Cited

U.S. PATENT DOCUMENTS

| | | | |
|---|---|---|---|
| 1,721,056 | 7/1929 | Schwartz | 137/887 X |
| 3,021,869 | 2/1962 | Ross | 137/625.47 X |
| 3,165,122 | 1/1965 | Sachnik | 137/625.47 |
| 3,472,484 | 10/1969 | Parker | 137/625.41 X |
| 3,584,571 | 6/1971 | Schmoll | 101/366 X |
| 3,689,748 | 9/1972 | Bothne | 137/625.41 X |
| 4,281,597 | 8/1981 | Dressler | 101/366 X |

FOREIGN PATENT DOCUMENTS

| | | |
|---|---|---|
| 310451 | 1/1919 | Fed. Rep. of Germany . |
| 1133737 | 7/1962 | Fed. Rep. of Germany . |
| 2201277 | 7/1973 | Fed. Rep. of Germany . |
| 3031734 | 3/1981 | Fed. Rep. of Germany . |
| 3229682 | 2/1984 | Fed. Rep. of Germany . |
| 3324308 | 1/1985 | Fed. Rep. of Germany . |
| 65721 | 11/1969 | German Democratic Rep. . |

*Primary Examiner*—A. Michael Chambers
*Assistant Examiner*—John C. Fox
*Attorney, Agent, or Firm*—Frishauf, Holtz, Goodman & Woodward

[57] ABSTRACT

To easily control flexographic printing ink of different colors, and washing liquid, to a plurality of printing plates on a plurality of printing stations of a system, a valve housing (26) is formed with a plurality of connection ducts, each coupled to a respective ink and washing fluid supply line. A plurality of elongated plug valve elements (41) are located in bores of the housing, the valve elements having axial bores and axially and circumferentially offset radial bores, leaving a portion of the plug elements solid to form an OFF position. The radial bores can be aligned, upon rotation of the valve elements, with coupling ducts which, in turn, connect with second fluid connection ducts (27–30, 31). Selectively, flow connection between selected supply lines and selected receiving lines are established by a fluid path: second fluid connection ducts (27–30, 31), a selected radial bore (45–48, 49) in the valve element, through a coupling duct (40) in alignment with the selected radial bore, the axial bore (44) of the valve element and one of the first connection ducts (36–39).

20 Claims, 3 Drawing Sheets

MULTI-LIQUID CONTROL VALVE SYSTEM, PARTICULARLY FOR FLEXOGRAPHIC INK OF DIFFERENT COLORS

The present invention relates to apparatus to control the supply of liquids used in printing machines of different characteristics from a plurality of supply lines to a plurality of receiving lines, and more particularly to a control valve system to control the flow of flexograph printing ink of various colors, and ink washing liquid, typically water, to various plates of a multi-printing station, or printing units, of a flexographic printing machine system.

BACKGROUND

Control valve arrangements for various inks are known, for example, as described in German Pat. No. 11 33 737. This patent discloses four liquid application devices, to apply ink to respective plates of a printing machine. Each liquid application device is associated with a plate, to be inked, of a plate cylinder which carries four printing plates next to each other. Each liquid application device has four liquid receiving lines coupled thereto, each one associated with a respective ink color. A valve or cock or faucet element is located in each one of the receiving lines.

To control four possible colors to connect with four application devices require sixteen valves or cocks. Remote operation of such valves, for example electromagnetically operated from a control panel, then requires sixteen positioning devices and controls therefor. The number of elements which must be moved is large, and such an arrangement is complex and, hence, expensive and difficult to maintain. It requires substantial space since each one of the cocks or valves must be readily accessible.

THE INVENTION

It is an object to provide a liquid control system which permits, easily, control of liquids of various characteristics, typically flexographic ink of various colors, and of washing liquid, to multiple utilization positions, typically multiple ink application devices for multiple plates of a printing system, in which the number of movable elements is substantially reduced, and control thereof simplified.

Briefly, a housing structure is formed with a plurality of essentially parallel bores into which faucet plug or cock valve elements are introduced, and the rotary position of which can be controlled. Each of the valve elements is formed with an axial bore and further with a plurality of radial bores, which are circumferentially and axially offset. The housing structure also is formed with a plurality of first fluid connection means hydraulically coupled to the axial bores of the valve elements and a second plurality of fluid connection means, together with coupling ducts, for association with selected radial bores, that is, located in alignment with respective axial positions of the radial bores. The first connection ducts can then be connected to the supply lines and the second connection duct to the receiving lines, the supply lines being connected to the supply of ink and the receiving lines to the printing system application devices. The respective supply lines and receiving lines are interchangeable. The rotary position of the valve elements can be easily controlled by coupling the valve elements to a stepping motor or the like.

The system has the advantage that it is readily possible to selectively establish flow communication between a selected supply line and a selected receiving line by rotating the valve elements, to thereby provide fluid communication between the selected second fluid connection means and, via selected radial bores and the axial bores in the valve elements, to the first connection means or ducts.

DRAWINGS

DETAILED DESCRIPTION

Figure 1:
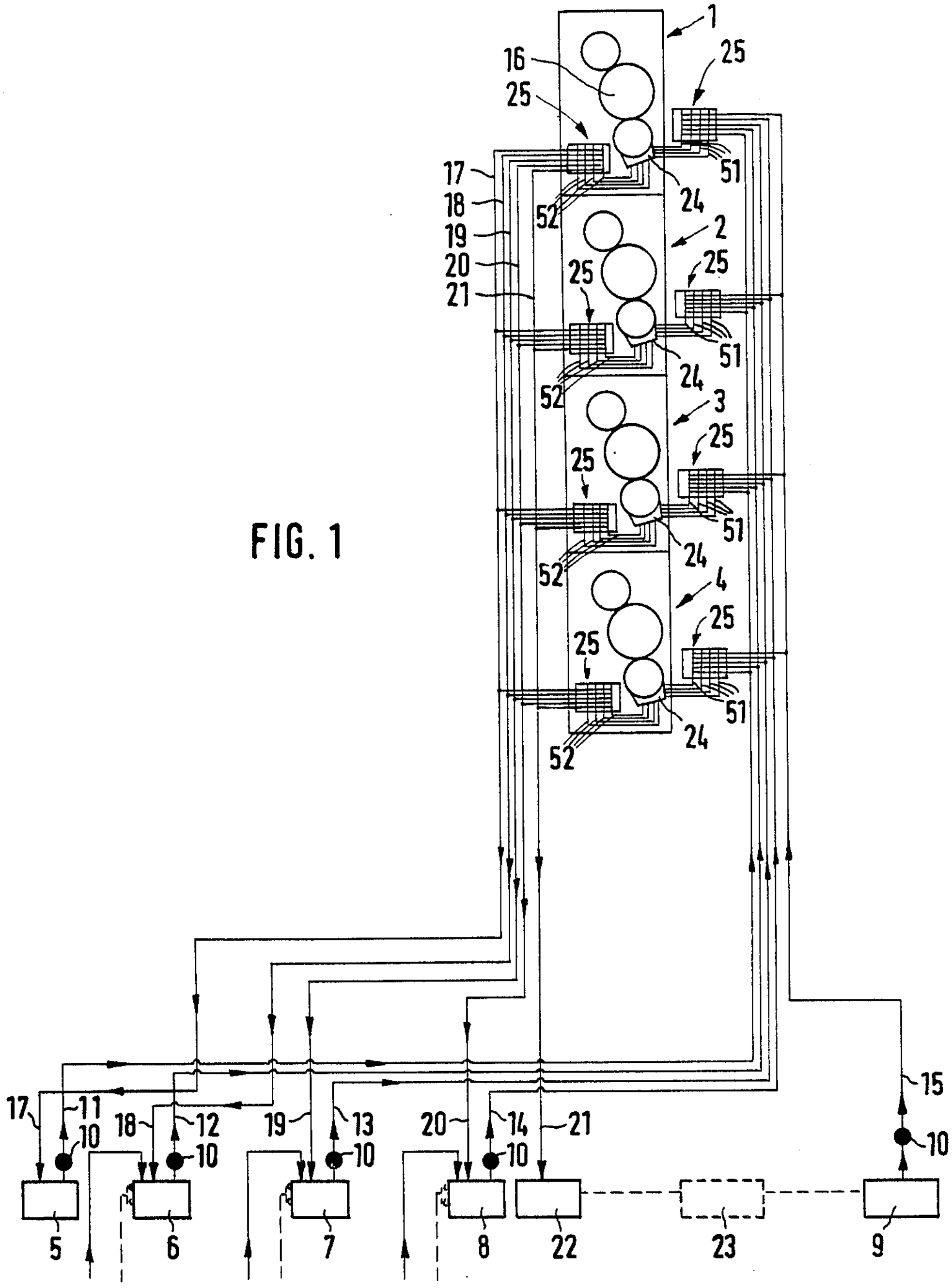
FIG. 1 is a schematic diagram of a flexographic printing machine with associated ink connecting lines and washing water connecting lines.

The flexographic printing machine system illustrated in FIG. 1 has a plurality of individual printing stations 1, 2, 3, 4, which are supplied with ink from ink supply tanks 5, 6, 7, 8 located beneath a frame (not shown) of the machine. A tank 9 is provided for washing water. A plurality of pumps 10 and supply lines 11, 12, 13, 14 for ink, and supply line 15 for washing water, supply the printing stations 1–4 of the system.

Each one of the printing stations 1–4 has a plate forme cylinder, for example a cylinder 16. Each one of the plate forme cylinders 16 carries four printing plates located axially adjacent each other.

Each one of the printing stations is to receive a selected color ink, as well as washing water.

Black ink from tank 5 is supplied over line 11;
blue ink from tank 6 is supplied over line 16;
red ink from tank 7 is supplied over line 13;
yellow ink from tank 8 is supplied over line 14;
washing water from tank 9 is supplied over line 15.

Ink which is in excess is returned to the tanks as follows:

Black ink through return line 17 to tank 5;
blue ink through return line 18 to tank 6;
red ink through return line 19 to tank 7;
yellow ink through return line 20 to tank 8;
used washing water through return line 21 to catch tank 22.

After each printing, the plates have to be washed, and the used washing water is cleaned after removal from the catch tank 22 in a cleaning and processing stage 23, which by and itself is well known, for recycling to the washing water tank 9.

An ink/water application device 24 is provided for each of the four adjacently positioned printing plates. Each one of the printing systems or printing stations 1, 2, 3, 4 has a valve unit 25 connected in advance thereto in order to supply the desired color printing ink, or washing liquid, respectively, and also to remove excess ink, or used washing water, respectively. The valve units for, respectively, supply of a selected color ink, and/or washing water, are identical, so that the unit 25 merely need be duplicated, which substantially facilitates maintenance and simplicity of the installation..

Figure 2:
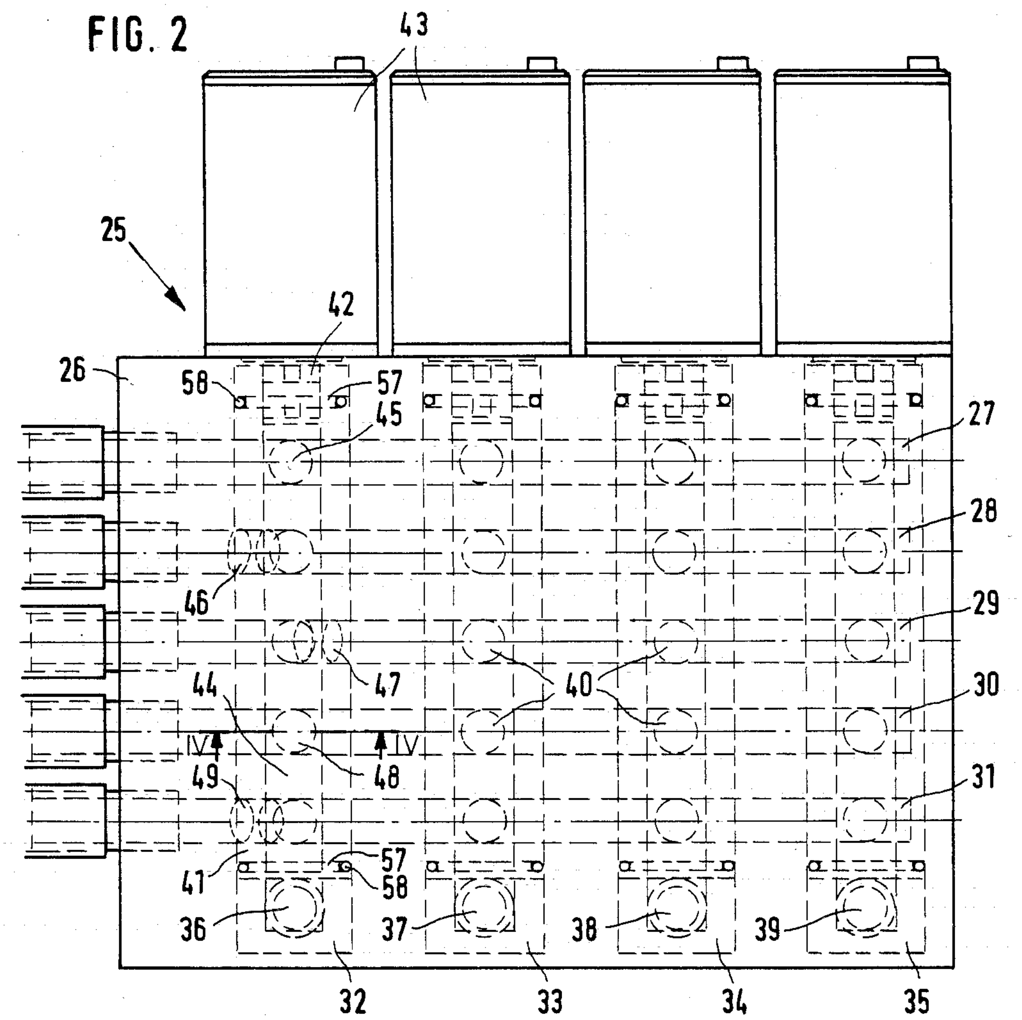
FIG. 2 is a top view of the control valve system in accordance with the present invention.
Figure 3:
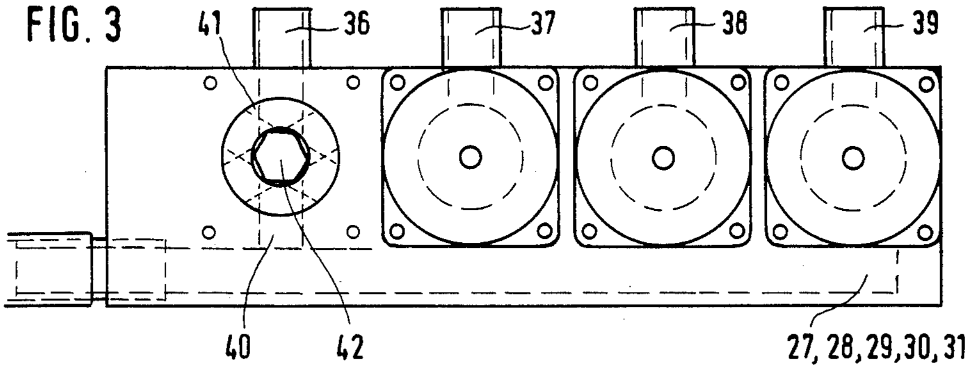
FIG. 3 is a side view of the structure of FIG. 2.

Referring now to FIGS. 2 and 3: The respective structures 25, each, have an essentially block-shaped housing 26. The lower portion of the housing, in longitudinal direction, is formed with five parallel, uniformly spaced bores 27, 28, 29, 30, 31; the bores form fluid connection means and, in FIG. 2, they are shown horizontally, located in columnar alignment and uniformly spaced from each other.

At right angles to the bores 27–31, and extending in rows, four longitudinal bores 32, 33, 34, 35 are located. The ends of the longitudinal bores 32–35 terminate in a first fluid connection means or duct 36, 37, 38, 39, extending longitudinally from the respective bores 32–35. The longitudinal bore 32 and the connection duct 36 associated therewith are associated with a fluid application device 24 of a respective printing station; the longitudinal bore 33 and duct 37 are associated with a second fluid application device 24 of any one of the printing systems 1–4; the longitudinal bore 34 and the connecting duct 28 are associated with a third fluid application 24 of any one of the printing systems 1, 2, 3, 4 and the longitudinal bore 35 and the connecting duct 39 are associated with a fourth fluid application device 24 of any one of the printing systems 1, 2, 3, 4.

Each one of the longitudinal bores 32, 33, 34, 35 is in fluid or hydraulic communication with each one of the bores 27, 28, 29, 30, 31 via a further connecting duct 40 extending perpendicularly to the respective longitudinal bores 32–35 and the bores 27–31 in the housing 26. The longitudinal bores 32–35 are closed with respect to one outer wall of the housing 26; they can be made as blind bores, or as through-bores, and closed by plugs. A respective cylindrical valve cock or plug element 41 is inserted in each one of the longitudinal bores 32–35, from the open side thereof, that is, in FIG. 2, from the upper side. Each one of the valve elements 41 has a diameter which is just slightly less than the diameter of the respective bores 32–35, to be snugly received therein but rotatable with respect thereto. The respective valve element axially extends throughout the length of the bores at least sufficiently long to permit covering, simultaneously, of all five connecting ducts 40 which extend from any one of the longitudinal bores 32–35. At the ends of the valve elements 41, close to the open side of the longitudinal bores 32–35, the valve elements are formed with a coupling extension 42, for example with a hexagonal head, to permit controlled rotation thereof.

A plurality of stepping motors 43, one for each of the valve elements 41, are connected to the housing 26, for example by a suitable flange connection or the like; the stepping motors 43 are formed at their shaft ends with sockets to snugly receive the hexagonal heads of the valve elements 41, to form an interengaging fit therewith.

Figure 4:
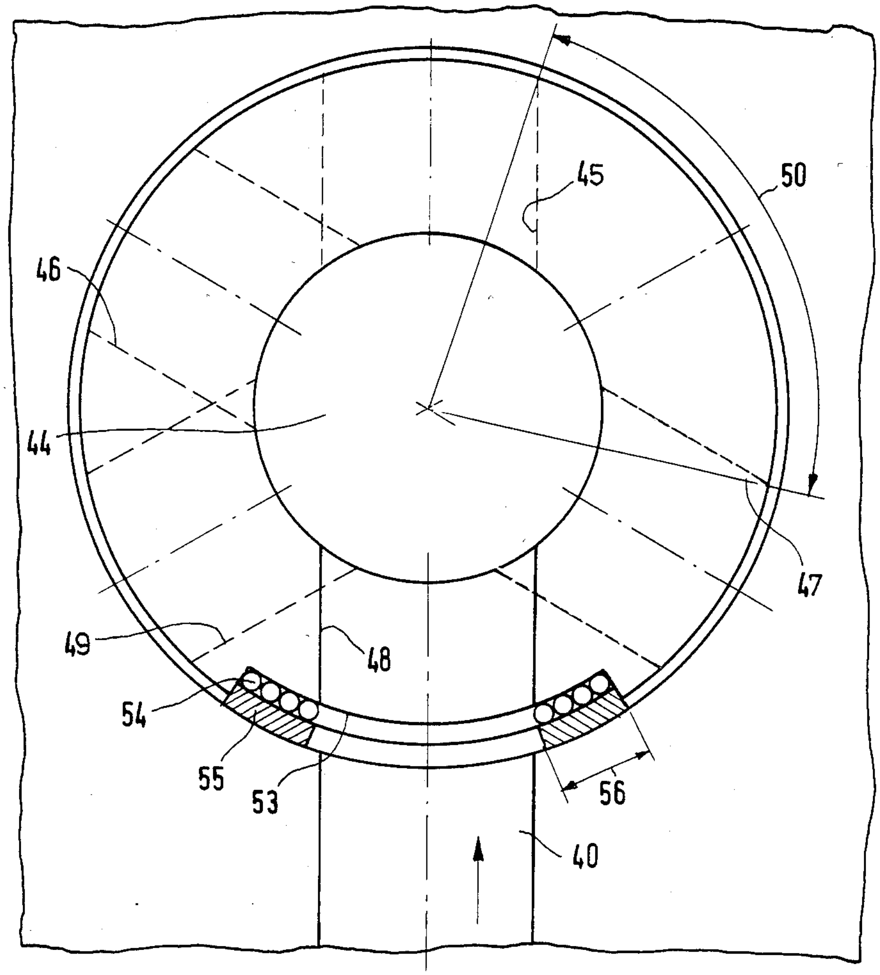
FIG. 4 is a cross-sectional view through one of the four valve elements along line IV—IV of FIG. 2.

As best seen in FIG. 4, each one of the valve elements 41 has a central axial bore 44 from which, at the level of the further connecting ducts 40, radial bores 45, 46, 47, 48, 49 branch off. The radial bores 45–49 are radially offset with respect to each other. In the example selected, five liquids are to be controlled—four colored ink and one washing liquid. An additional control position, namely an OFF position, should be provided, so that six rotary positions should be available. At the circumference of the valve element 41, thus, and extending over the entire length, a maximum of 300° of circumferential angle is thus available for the five radial bores 45–49, terminating at respectively different positions. The remaining 60° circumferential angle extends as a solid surface over the entire axial length of the element 41, free from radial bores, and is defined as the blocked or OFF position 50. The axial bore 44 is closed off at the end of the element 41 which has the connecting head 42, to rotate the element.

Each one of the bores 27–31, and in dependence on the use of the valve in advance of the printing system, can be connected for distribution of ink or washing water from one of the supply lines 11–15. Similarly, when the unit is connected to the removal lines 17–21, the respective bores 27–31 can be connected to the respective drain or removal lines.

When using the valve element 25 to supply liquid to one of the printing units 1–4, a connecting line 51 is coupled to the first fluid connecting duct 36–39 with the respective lines 51—see FIG. 1—each one of the lines 51 leading to a respective application device 24. An identical valve unit can be used to redistribute collected excess ink liquid from the respective application devices 24 to the removal lines 17–20 and the used washing liquid line 21. If the valve unit 25 is so used, the respective fluid connection means or ducts 36–39 are connected to return lines 52, leading from the respective liquid application devices 24.

The drive motor 43—FIG. 2—for the respective valve elements 41 preferably is a stepping motor. Use of a stepping motor permits accurate metering by the valve element. The valve element 41 can be rotated so that a radial bore 45–49 will be in precise connecting alignment with one of the connecting ducts 40.

OPERATION

Rotation of the respective valve elements 41 by the motors 43 permit precise alignment of one of the axially and radially staggered bore 45–49 in the element 41 with one of the connecting ducts 40. The second fluid ducts 27–31, which are in hydraulic communication with the respective ducts 40, thus can supply or drain fluid supplied by the respective supply lines 11–15 or the drain lines 17–21, respectively. Fluid can flow, then, over the selectively aligned radial bore 45–49 from the duct 40, into the axial bore 44 of the valve element, and from the axial bore 44 to one of the first fluid connection means or ducts 36–39, for further fluid flow to, or from, the respective liquid application device 24, respectively, the connecting ducts 51 or 52. The flow direction is reversed if the unit 25 is coupled in the drain lines 17–21, that is, downstream of the application device 24.

Motors 43 can be controlled to rotate the valve element 41 in the OFF position 50, in which the solid portion of the OFF position 50 will be in alignment with all the ducts 40 which are aligned with the respective longitudinal bores 32–35. This is the OFF position of the respective element and flow through the axial bores for all the liquids is thereby interrupted.

Ink and washing water, respectively, should not leak into the narrow gap, to provide for rotation, between the valve element 41 and the wall of the longitudinal bore 32–35, respectively, in which the valve element is retained. To prevent leakage, as best seen in FIG. 4, the outer edge adjacent each one of the radial bores 45–49 on the valve element 41 is recessed, by forming a milled slot 53 therein. A seal, supported on an elastic material, is located within the milled slot. The elastic material with which the bottom of the milled slot 53 is lined may, for example, be a plurality of rubber rings 54, securely attached to the bottom of the milled slot, for example by an adhesive, and which can slightly deform under pressure, and press the actual sealing element 55 against the wall of the longitudinal bore 32–35 in which the respective valve element 41 is retained. The fit can be tight, and upon insertion of the element, the rings 54 can deform, and press the seal 55 which, preferably, is made of readily slidable plastic material such as Teflon (trademark), that is, polytetrafluoroethylene (PTFE), fitting against the inner wall of the respective bore.

The seal 55 can be made to have a substantial circumferential extent so that, by suitable control of the stepping motors 43, and use of motors having fine stepping divisions, it is possible to provide for partial alignment of the respective radial bores 45–49 with the connecting ducts 40. The full cross section of the respective radial bores 45–49, when not aligned with the respective connecting duct 40, permits proportoioning or controlling the flow through-put of the valve. FIG. 4 shows an exact alignment of duct 48 and duct 40; it is, however, equally possible to change the position by suitable control of the stepping motor so that the throughput can be less than the full alignment, by for example just slightly under the width 56 of the respective seal 55. Analog control of liquid flow thus can be obtained.

The valve elements 41 are formed with additional seals, as best seen in FIG. 3. In the region of their forward and rearward end, the elements 41 are formed with a circumferential groove 57 into which a sealing ring, such as an O-ring 58, is placed, and bearing against the wall of the respective longitudinal bore 32–35.

It is not necessary that all the elements 41 are located in a single housing block 26. It is equally possible to arrange the system such that individual bores 32 are located in individual blocks, with the connecting bores in alignment, to provide for a modular construction. The aligned elements, then, for example by interpolation of a gasket, can be clamped together by a suitable clamping frame or by connecting screws. This permits ready expansion of the system to more than four ink colors, and washing liquid.

The number of liquid application devices on each of the printing stations, as shown in FIG. 1, is selected merely as an example; any other number may be used. It is quite possible to provide valve elements 41 with substantially more than five radial bores, merely by suitably selecting the diameters of the respective bores 45–49 and increasing the cross-sectional dimension of the element 41.

The present invention is specifically suitable for combination with flexographic printing machines, where switchover between differently colored inks with a minimum of changes of valves, and with ease of control from a control panel, by operation of the motor 43, is desirable. The invention can be used, however, in other applications as well, in which fluids having different characteristics and being supplied by supply lines are to be directed to selected receiving lines in accordance with control commands.

We claim:

1. Multi-liquid control valve system to selectively control flow of differently colored printing ink, and washing liquid from a plurality of supply lines (11–14, 15) to a plurality of receiving lines (17–20, 21) for use in a multi-color printing machine having a plurality of printing systems or stations (1–4), each having a plurality of plate cylinders (16), and means (24) for selectively applying printing ink of a selected color, or washing liquid, to respectively selected cylinders comprising a valve housing (26);

a plurality of essentially parallel bores (32–35) formed in the housing;

a plurality of elongated faucet or cock or plug valve elements (41), one each located in a respective one of said bores (32–35), and wherein each of said valve elements (41) is formed with an axial bore (44), and is further formed with a plurality of radial bores (45–48, 49), in fluid communication with said axial bore, said radial bores being, each, axially staggered with respect to each other along said valve element (41);

a plurality of first fluid connection duct means (36–39) formed in the housing, each respectively hydraulically coupled to a respective axial bore (44) of a respective valve element (41);

a plurality of second fluid duct connection means (27–30, 31) formed in the housing;

a plurality of coupling ducts (40) formed in the housing and positioned for alignment with selected radial bores (45–48, 49) in the respective valve elements, for hydraulically coupling one of said plurality of the second fluid connection duct means (27–30, 31) for connection with a selected radial bore (45–48, 49) of the valve elements, the radial bores (45–48, 49) of the valve elements (41) being circumferentially offset relative to each other;

means for connecting said first connection duct means (36–39) to one of said plurality of lines;

means for connecting said second connection duct means (27–30, 31) to the other of said plurality of lines; and means (42, 43) for rotating said valve elements (41) to selectively establish flow connection between selected supply lines and selected receiving lines by establishing a connection between a selected second fluid connection duct means (27–30, 31), a selected radial bore (45–48, 49) in the valve element (41), through a coupling duct (40) in alignment with the selected radial bore, the axial bore (44) in the valve element and one of the first connection ducts (36–39).

2. The system of claim 1, wherein the valve element (41) is formed with a solid circumferential surface between adjacent radial bores extending over a distance between two adjacent radial bores to form a blocked or OFF position (50), so that a "valve off" position of the valve element will be formed when said solid portion is opposite a coupling duct (40).

3. The system of claim 1, wherein the valve housing (26) is common for a plurality of valve elements (41).

4. The system of claim 1, wherein the valve element (41) comprises an elongated cylinder, said axial bore (44) extending centrally and longitudinally thereof, and said radial bores extending in a manner of radial spokes, axially and radially offset with respect to each other from said central bore to the cylindrical circumference thereof.

5. The system of claim 4, wherein the valve element (41) is formed with a solid circumferential surface between adjacent radial bores extending over a distance between two adjacent radial bores to form a blocked or OFF position (50), so that a "valve off" position of the valve element will be formed when said solid portion is opposite a coupling duct (40.

6. The system of claim 1, wherein the valve elements comprise elongated cylindrical structures;

a circumferential groove (57) formed at the forward and rear end of said elongated cylindrical structures, and a sealing ring (58) inserted in said circumferential groove to seal the valve element within the respective bore (32–35) formed in the housing.

7. The system of claim 1, wherein said valve elements comprise cylindrical structures;

a recess (53) is formed in the outer surface of the cylindrical structure surrounding each of the radial bores (45–48, 49); and a sealing means (54, 55) is located in said recess to seal the region of said valve element surrounding the respective radial bore in the inside of the respective parallel bore formed in the housing.

8. The system of claim 7, wherein said sealing means (55) comprises an elastically deformable element (54) located in the groove of said recess (53) and a sealing ring of material having a slippery surface located above said elastically deformable element and engaging the inner wall of the respective parallel bore (32–35).

9. The system of claim 1, wherein each of the first fluid duct connection means (36–39) are connected to a respective receiving line (17–20, 21);

and each of the second fluid duct connection means (27–30, 31) and the coupling duct means (40) are connected to respective supply lines (11–14, 15).

10. The system of claim 1, wherein each of the first fluid duct connection means (36–39) is connected to a respective supply line (11–14, 15);

and each of the second fluid duct connection means (36–39) and hence the respective coupling ducts (40) are connected to respective ones of the receiving lines (17–20, 21).

11. The system of claim 1, wherein said means for rotating the valve elements (41) comprises a stepping motor (43), and coupling means (42) are provided, coupling the respective stepping motors to said valve elements in rotation-transmitting relation.

12. In combination with a multi-color flexographic printing machine, a multi-liquid control valve system to selectively control flow of inks of different colors, and washing liquid from a plurality of supply lines (11–14, 15) to a plurality of receiving lines (17–20, 21), the multi-color printing machine having a plurality of printing systems or stations (1–4), each having a plurality of plate cylinders (16), and means (24) for selectively applying printing ink of a selected color, or washing liquid to respectively selected plate cylinders comprising a valve housing (26);

a plurality of essentially parallel bores (32–35) formed in the housing;

a plurality of elongated faucet or cock or plug valve elements (41), one each located in a respective one of said bores (32–35), and wherein each of said valve elements (41) is formed with an axial bore (44), and is further formed with a plurality of radial bores (45–48, 49), in fluid communication with said axial bore, said radial bores being, each, axially staggered with respect to each other along said valve element (41);

a plurality of first fluid connection duct means (36–39) formed in the housing, each respectively hydraulically coupled to a respective axial bore (44) of a respective valve element (41);

a plurality of second fluid duct connection means (27–30, 31) formed in the housing;

a plurality of coupling ducts (40) formed in the housing and positioned for alignment with selected radial bores (45–48, 49) in the respective valve elements, for hydraulically coupling one of said plurality of the second fluid connection duct means (27–30, 31) for connection with a selected radial bore (45–48, 49) of the valve elements, the radial bores (45–48, 49) of the valve elements (41) being circumferentially offset relative to each other;

means for connecting said first connection duct means (36–39) to one of said plurality of lines;

means for connecting said second connection duct means (27–30, 31) to the other of said plurality of lines; and means (42, 43) for rotating said valve elements (41) to selectively establish flow connection between selected supply lines and selected receiving lines by establishing a connection between a selected second fluid connection duct means (27–30, 31), a selected radial bore (45–48, 49) in the valve element (41), through a coupling duct (40) in alignment with the selected radial bore, the axial bore (44) in the valve element and one of the first connection ducts (36–39).

13. The combination of claim 12, wherein the valve element (41) is formed with a solid circumferential surface between adjacent radial bores extending over a distance between two adjacent radial bores to form a blocked or OFF position (50), so that a "valve off" position of the valve element will be formed when said solid portion is opposite a coupling duct (40).

14. The combination of claim 12, wherein the valve element (41) comprises an elongated cylinder, said axial bore (44) extending centrally and longitudinally thereof, and said radial bores extending in a manner of radial spokes, axially and radially offset with respect to each other from said central bore to the cylindrical circumference thereof.

15. The combination of claim 12, wherein said valve elements comprise cylindrical structures;

a recess (53) is formed in the outer surface of the cylindrical structure surrounding each of the radial bores (45–48, 49); and a sealing means (54, 55) is located in said recess to seal the region of said valve element surrounding the respective radial bore in the inside of the respective parallel bore formed in the housing.

16. The combination of claim 12, wherein each of the first fluid duct connection means (36–39) are connected to a respective receiving line (17–20, 21);

and each of the second fluid duct connection means (27–30, 31) and the coupling duct means (40) are connected to respective supply lines (11–14, 15).

17. The combination of claim 12, wherein each of the first fluid duct connection means (36–39) is connected to a respective supply line (11–14, 15);

and each of the second fluid duct connection means (36–39) and hence the respective coupling ducts (40) are connected to respective ones of the receiving lines (17–20, 21).

18. The combination of claim 12, wherein said valve elements comprise cylindrical structures;

a recess (53) is formed in the outer surface of the cylindrical structure surrounding each of the radial bores (45–48, 49); and a sealing means (54, 55) is located in said recess to seal the region of said valve element surrounding the respective radial bore in the inside of the respective parallel bore formed in the housing.

19. The combination of claim 18, wherein said sealing means (55) comprises an elastically deformable element (54) located in the groove of said recess (53) and a sealing ring of material having a slippery surface located above said elastically deformable element and engaging the inner wall of the respective parallel bore (32–35).

20. The combination of claim 12, wherein said means for rotating the valve elements (41) comprises a stepping motor (43), and coupling means (42) are provided, coupling the respective stepping motors to said valve elements in rotation-transmitting relation.

* * * * *